US010278047B2

(12) United States Patent
White, Jr. et al.

(10) Patent No.: US 10,278,047 B2
(45) Date of Patent: Apr. 30, 2019

(54) PRESENCE INDICATOR SIGNAL

(71) Applicant: Cisco Technology, Inc., San Jose, CA (US)

(72) Inventors: David C. White, Jr., Durham, NC (US); Magnus Mortensen, Cary, NC (US); Jay Kemper Johnston, Raleigh, NC (US); Rama Darbha, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/798,434

(22) Filed: Oct. 31, 2017

(65) Prior Publication Data
US 2018/0124553 A1 May 3, 2018

Related U.S. Application Data

(62) Division of application No. 15/196,066, filed on Jun. 29, 2016, now Pat. No. 9,860,685.

(51) Int. Cl.
| | |
|---|---|
| *H04W 24/00* | (2009.01) |
| *H04W 4/80* | (2018.01) |
| *H04W 64/00* | (2009.01) |
| *H04L 29/08* | (2006.01) |
| *H04W 40/24* | (2009.01) |
| *H04W 8/24* | (2009.01) |
| *H04M 1/725* | (2006.01) |

(52) U.S. Cl.
CPC .............. *H04W 4/80* (2018.02); *H04L 67/22* (2013.01); *H04L 67/24* (2013.01); *H04W 64/00* (2013.01); *H04M 1/72519* (2013.01); *H04M 1/72522* (2013.01); *H04W 8/245* (2013.01); *H04W 40/244* (2013.01)

(58) Field of Classification Search
CPC ....... H04W 64/00; H04W 8/245; H04W 4/80; H04W 40/244; H04M 1/72519; H04M 1/72533; H04L 67/22; H04L 67/24
USPC ..................... 455/456.2, 418, 550.1, 420
See application file for complete search history.

(56) References Cited

U.S. PATENT DOCUMENTS

| | | |
|---|---|---|
| 5,929,848 A | 7/1999 | Albukerk et al. |
| 8,203,910 B2 | 6/2012 | Zhao et al. |
| 8,588,818 B2 | 11/2013 | Huang et al. |
| 2005/0096047 A1 | 5/2005 | Haberman et al. |
| 2008/0070612 A1 | 3/2008 | Weinans |
| 2008/0305519 A1* | 12/2008 | Lin .................... C07K 5/06026 435/68.1 |

(Continued)

OTHER PUBLICATIONS

Zonith Indoor Positioning System (IPS); Dec. 29, 2015; available on the web at: http://www.zonith.com/products/ips/.

(Continued)

*Primary Examiner* — Danh C Le
(74) *Attorney, Agent, or Firm* — Behmke Innovation Group LLC; James Behmke; Stephen D. LeBarron

(57) ABSTRACT

In one embodiment a method for providing presence information in a smart environment is implemented on a personal computing device associated with a user and includes: broadcasting a presence indicator signal in the smart environment, where the presence indicator signal indicates presence of the user in the smart environment, and the personal computing device is not provided by an operator of the smart environment.

12 Claims, 4 Drawing Sheets

(56) References Cited

U.S. PATENT DOCUMENTS

| | | |
|---|---|---|
| 2009/0157861 A1 | 6/2009 | Kakuta et al. |
| 2010/0173585 A1* | 7/2010 | Button .................. H04L 12/282 455/41.3 |
| 2012/0190386 A1* | 7/2012 | Anderson ............. G01C 15/04 455/456.3 |
| 2013/0018661 A1 | 1/2013 | Padgett et al. |
| 2013/0254104 A1* | 9/2013 | Fernandez ............. H04W 4/70 705/21 |
| 2013/0310081 A1 | 11/2013 | Chu |
| 2014/0073244 A1 | 3/2014 | Ko et al. |
| 2014/0232382 A1* | 8/2014 | Goodyear ................ A61B 5/05 324/239 |
| 2014/0357431 A1 | 12/2014 | Esteves |
| 2015/0061829 A1 | 3/2015 | Williams et al. |
| 2015/0242015 A1 | 8/2015 | Cho et al. |
| 2016/0094700 A1 | 3/2016 | Lee et al. |
| 2016/0105772 A1* | 4/2016 | Cohen .................. H04W 4/029 455/456.3 |
| 2016/0105773 A1* | 4/2016 | Wawrowski .......... H04W 4/029 455/456.2 |
| 2016/0112214 A1 | 4/2016 | Currivan et al. |
| 2016/0210416 A1 | 7/2016 | Whitehurst |
| 2016/0295372 A1* | 10/2016 | Kapicioglu ....... G06F 17/30241 |
| 2016/0314518 A1* | 10/2016 | Goodwin ........... G06Q 30/0637 |
| 2017/0104704 A1 | 4/2017 | Choi et al. |

OTHER PUBLICATIONS

My Disney Experience, Jun. 21, 2016; available on the web at: https://disneyworld.disney.go.com/faq/my-disney-experience/my-magic-plus-privacy/.

Houston TranStar and Bluetooth™ Traffic Monitoring: Dec. 1, 2015; available on the web at: http://traffic.houstontranstar.org/bluetooth/transtar_bluetooth.html.

Gottipati, Hari, "With Beacon, Apple is going to dump on NFC and embrace the internet of things"; Sep. 10, 2013; available on the worldwide web at: https://gigaom.com/2013/09/10/with-ibeacon-apple-is-going-to-dump-on-nfc-and-embrace-the-internet-of-things/.

Kuang, Cliff; Disney's $1 Billion Bet on a Magical Wristband, Mar. 10, 2015; available on the web at: http://www.wired.com/2015/03/disney-magicband/.

Sinopoli, Jim, "Indoor Positioning Systems: We Know Where You Are"; Jan. 1, 2013, available on the web at: http://www.smart-buildings.com/uploads/1/1/4/3/11439474/2013febindoor.pdf.

Woolley, Martin, "Bluetooth Smart Technology Coming Soon to a Smart Building Near You"; Oct. 9, 2014; available on the web at: http://blog.bluetooth.com/bluetooth-smart-technology-coming-soon-to-a-smart-building-near-you/.

* cited by examiner

US 10,278,047 B2

PRESENCE INDICATOR SIGNAL

RELATED APPLICATION INFORMATION

The present application is a division of U.S. application Ser. No. 15/196,066, filed on Jun. 29, 2016 and entitled "PRESENCE INDICATOR SIGNAL.

FIELD OF THE INVENTION

The present invention generally relates to the broadcast of presence indicator signals to track human presence in a smart environment

BACKGROUND OF THE INVENTION

Smart environments are designed to leverage pervasive computing and the availability of inexpensive computing power to provide optimized facility services (e.g. illumination, thermal comfort, air quality, physical security, sanitation, etc.) while minimizing resource usage and environmental impact. A variety of systems and methods for employing wireless technologies such as, for example, RFID, WiFi, Bluetooth, etc., can be leveraged to monitor human movement and/or presence in smart environments in order to more optimally provide such services.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
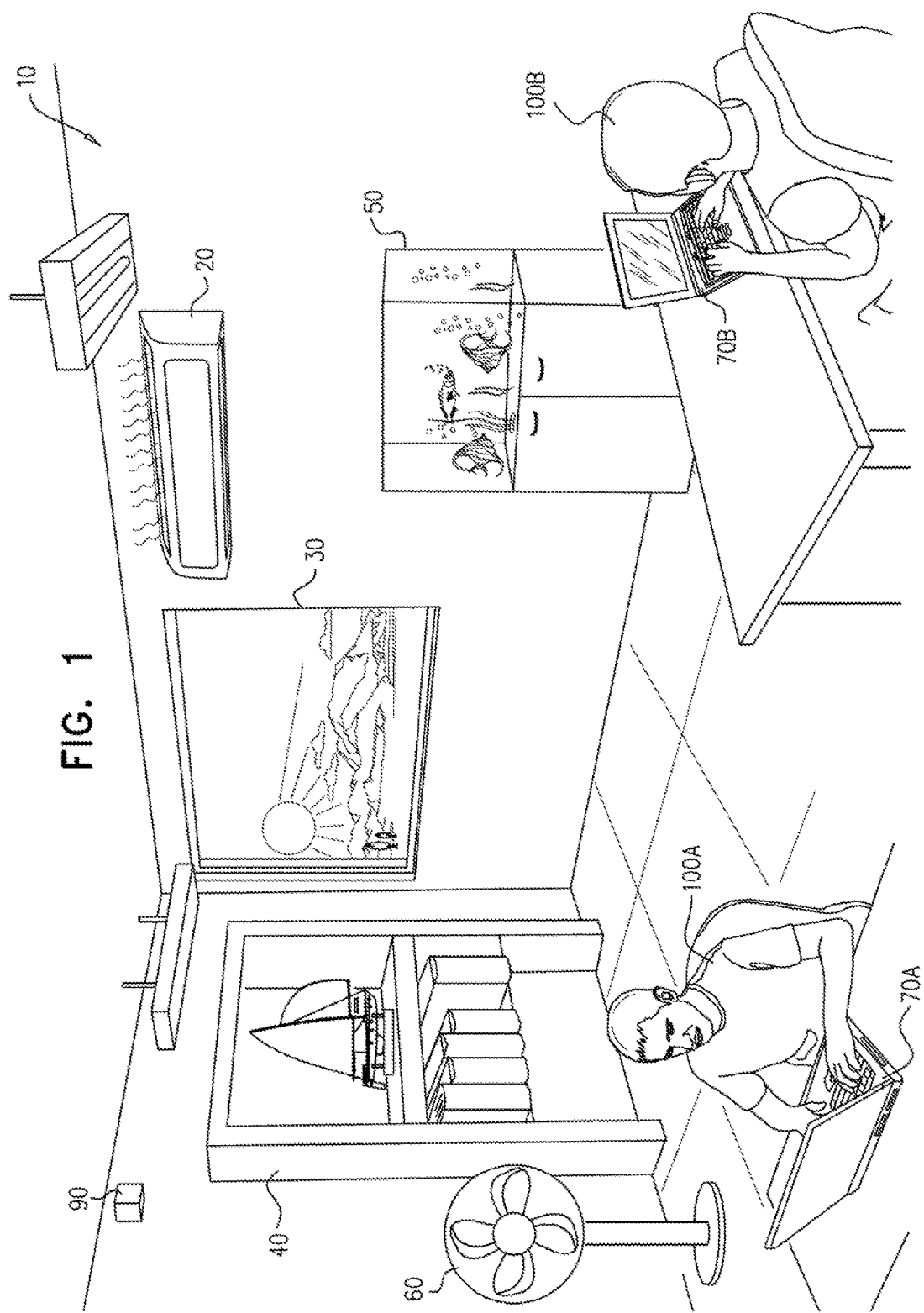
FIG. 1 is a simplified pictorial illustration of a presence-aware smart environment, constructed and operative in accordance with embodiments described herein.

A method for providing presence information in a smart environment is implemented on a personal computing device associated with a user and includes: broadcasting a presence indicator signal in the smart environment, where the presence indicator signal indicates presence of the user in the smart environment, and the personal computing device is not provided by an operator of the smart environment.

A method for providing presence information in a smart environment, is implemented on a first computing device associated with a user and includes: detecting at least a second computing device associated with the user, exchanging information regarding at least broadcast capabilities and human presence detection capabilities with the second computing device, and based on the exchanged information, electing a primary device to broadcast a presence indicator signal, the primary device elected from among the first and at least second devices.

Detailed Description of Example Embodiments

A common objective of smart environment management systems is to customize the environment in response to the presence and/or movements of the environment's occupants (both human and machine). Efficient operation of a smart environment is therefore typically predicated at least in part on an awareness of its occupants; e.g., where they are, where they are going, and how many are in a given area.

Current occupancy detection systems typically rely on thermal or optical detection of movement as a method for identifying the presence of a person. However, common obstructions, such as bookcases and other furniture, may prevent such systems from functioning properly. Such systems may also be prone to false positives caused by, for example, moving shadows cast from sunlight outside, thermal changes in the room due to changes in HVAC/thermal hot spots, animal movements, rotating fans, or motion prompted by air movement, e.g., paper floating on air currents from an open window, a fan, or an HVAC unit.

For example smart environment management systems often use occupancy detection systems based on motion detection sensors to determine whether or not to turn off office lighting in order to conserve electricity. If no motion is detected for a given period (e.g., fifteen minutes), the occupancy detection system may indicate that an office is empty (i.e., there are no people in the office) and the smart environment management system may turn off the lights. However, if a person is relatively still while reading or working on a computer, the motion sensors may not adequately detect him/her. In some situations this may lead to a recurring irritant to the person who may be forced with the choice of either sitting in the dark, getting up to turn on the lights every fifteen minutes, or to constantly make waving motions in order to prevent the smart environment management system from turning off the lights. Furthermore, it will he appreciated that many fluorescent lights have a ramp up period before they achieve maximum efficiency. Therefore, turning them off and on many times a day may actually be more costly than leaving them running continuously throughout the day.

Reference is now made to FIG. 1, is a simplified pictorial illustration of an exemplary presence-aware smart environment 10, constructed and operative in accordance with embodiments described herein. As depicted in FIG. 1, environment 10 may represent a typical office set up to accommodate users 100A and 100B. Environment 10 comprises air conditioner 20, window 30, bookcase 40, fish tank 50, fan 60, laptop computers 70A and 70B, and Bluetooth receiver 90.

It will be appreciated that common office artifacts such as air conditioner 20, window 30, bookcase 40, and fish tank 50 may impede the proper operation of conventional occupancy detection systems. Systems employing heat detection to isolate human profiles may be affected by air conditioner 20 or sunlight from window 30. Systems employing motion sensors may be affected by shadows from objects moving outside of window 30, the movements of fish in fish tank 50, rotating motions by fan 60, and/or paper blown in the air by either fan 60 or air conditioner 20. Bookcase 40 may block reception for typical sensors as well.

It will be appreciated that most people carry or wear at least one Bluetooth low energy (LE) capable device. Typical examples of such devices include smartphones, computer tablets/laptops, and wearable devices such as smartwatches, fitness trackers, and Bluetooth headsets. These devices may be configured to periodically broadcast a presence indicator signal via Bluetooth LE. In accordance with some embodiments, the presence indicator signal may be a personal ID broadcast specifically associated with an individual user, typically the owner of the device. Accordingly, the personal ID Beacon may provide one or more identifying details associated with the individual user, such as, for example, the user's name, nickname, email address, phone number, etc. In some cases the identifying details may not be specific to an individual user. For example the identifying details may be associated with a group of users or users characterized by common user preferences and/or attributes. Alternatively, or in addition, the presence indicator signal may be "generic", such that it may signify the presence of a person without providing an indication of the user's identity.

In accordance with embodiments described herein, a smart environment system may use presence information provided by Bluetooth LE devices to adjust/maintain the smart environment. For example, while in use by users 100A and 100B, laptops 70A and 70B may be configured to periodically broadcast a presence indicator signal that may be received by Bluetooth receiver 90. The smart environment management system may then turn on/off lights and/or adjust temperature settings in environment 10 in accordance with the detection (or non-detection) of users 100A and 100B in the affected area. The smart environment management system may also employ Internet of Things (IoT) devices and/or robots to adjust the smart environment.

The smart environment management system may employ the presence indicator signals as proxies for the humans associated with the device transmitting the signals. In such manner, the smart environment management system may count the number of humans in a location or vicinity. Similarly, the transmissions of the presence indicator signals may be tracked/plotted to detect the movement (or lack of, thereof) of the associated humans. This information may then be used by the smart environment management system to instruct building facilities, robots, etc. to act to modify the environment in accordance with the presence (or non-presence) of the associated humans. For example, the smart environment management system may be configured to turn on/off lighting, turn on/off air conditioning, adjust thermostat settings, permit/deny physical access, and/or prioritize safety and rescue measures during emergencies based on the presence of humans in specific areas of the smart environment.

Additionally, the robots, e.g., drones or Internet of Things (IoT) devices, may similarly be equipped with Bluetooth LE functionality. As described with respect to the IDs associated with humans, each robot may be assigned either a personal or generic ID (i.e. genetically signifying that it is associated with a robot, or type of robot, as opposed to a human), depending on a desired level of granularity. This may be leveraged, for example, in emergency situations to provide information to rescue personnel regarding the number of human occupants in a building during evacuation situations, and to differentiate between humans and robots from among moving objects in the building.

Figure 2:
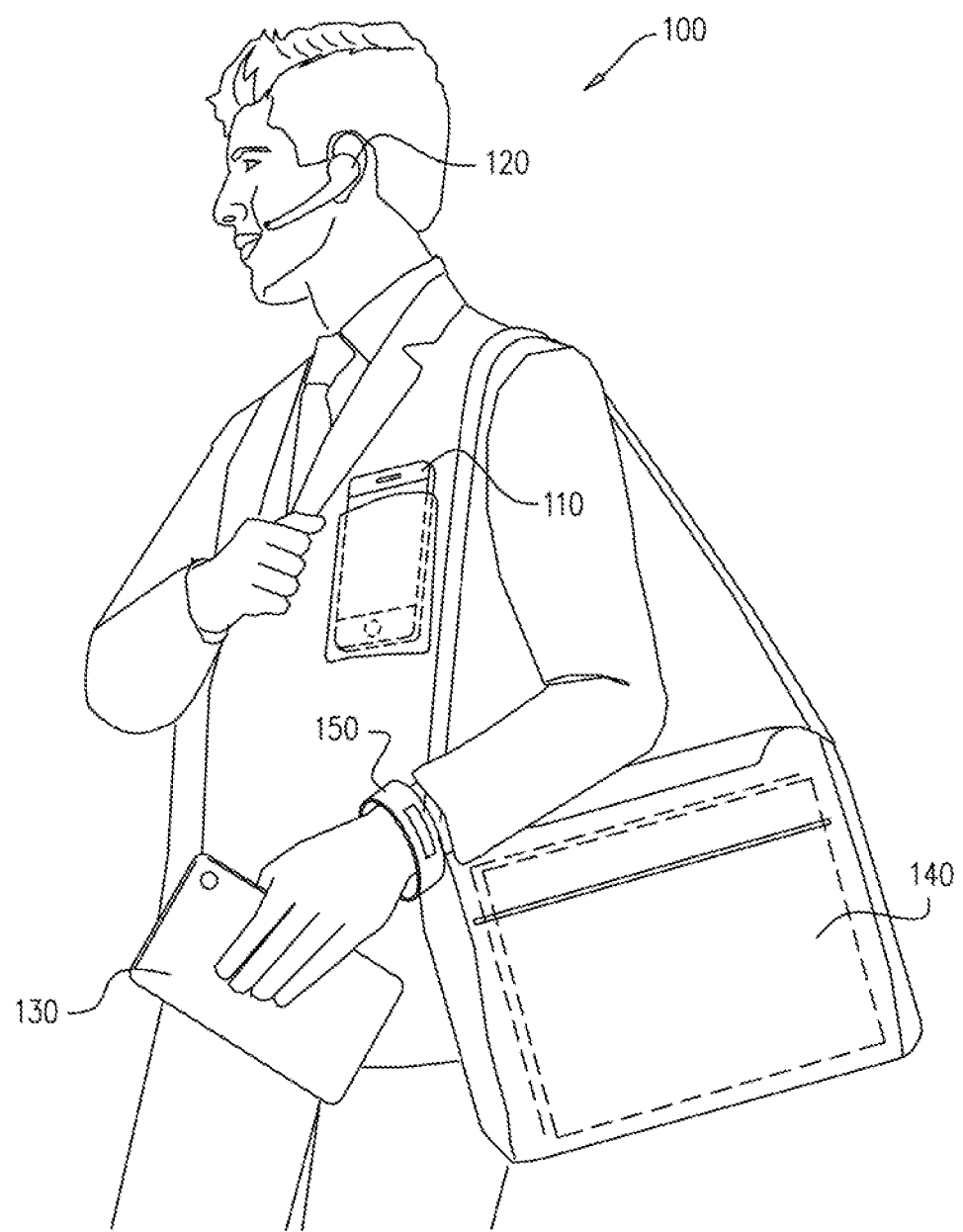
FIG. 2 is a simplified pictorial illustration of an occupant of the smart environment of FIG. 1 wearing and/or holding smart devices to be employed in the smart environment as monitoring devices.

Reference is now made to FIG. 2 which is a simplified pictorial illustration of one of the users 100 from the embodiment of FIG. 1. It will be appreciated that a person, e.g., user 100, may have multiple Bluetooth LE capable devices on, or near, his/her person at a given time. For example, user 100 may carry smartphone 110 in a pocket, wear Bluetooth headset 120, hold computer tablet 130 in a hand, have laptop 140 in a computer bag, and wear smartwatch or fitness tracker 150 on a wrist.

In accordance with embodiments described herein, if user 100 has multiple Bluetooth LE enabled devices, one of the devices may be designated as a "primary device" and configured to transmit a presence indicator signal to be associated with user 100. It will be appreciated that the other, non-primary, devices may be configured to prevent them from transmitting presence indicator signals, which would otherwise misrepresent the actual number of humans being tracked by the smart environment management or cause unnecessary resource (battery) consumption on those non-primary devices.

In accordance with embodiments described herein, the devices (e.g., smartphones, smartwatches, etc.) may be configured to intelligently provide a single presence indicator signal. Specifically, if user 100 has more than one device in close vicinity, they may communicate with each other to determine which device should transmit the presence indicator signal. Furthermore, the devices are configured to only transmit the presence indicator signal if it is reasonably determined that they are in close proximity to user 100. Therefore if user 100 leaves the vicinity of the device(s), the transmitting device is configured to stop transmitting the presence indicator signal; after all, it would be counterproductive to notify a smart environment management system of a person's presence if that, person had actually left without taking the device(s) with him/her.

Similarly, the type of presence indicator signal may be configurable based on the current environment. For example, when user 100 is at home or at work, the presence indicator signal may represent a personal ID beacon that is specifically associated with that particular user 100. When in other environments, the presence indicator signal may default to a generic setting. For example, when in a shopping mall, the presence indictor signal may represent a generic human with no personally identifying details.

In accordance with embodiments described herein, the current environment may be identified by the participating device according to geographical or location based services, such as, for example, global positioning satellite (GPS) systems or cell tower associations. User 100 may configure the smart device (e.g. smartphone 110, computer tablet 130, etc.) to broadcast the personal ID beacon when located in certain specific locations, for example, when, per the geographical/location based services the smart device is at home or work. A default setting may also be set for other locations; for example, to broadcast a generic beacon when not located at the certain specific locations. Accordingly, user 100 does not have to proactively select the type of beacon to broadcast whenever entering a new smart environment.

Alternatively, or in addition, the current environment may be determined at least in part based on data exchanged during a Bluetooth pairing process prior to transmitting the presence indicator signal. For example, a smart environment such as a workplace or courthouse may have installed Bluetooth transceivers that identify themselves and request that user 100 transmit their personal ID beacon, for safety reasons. Depending on the configuration of the smart device, the personal ID beacon for user 100 may be transmitted in response to the request.

Each of the personal devices associated with user 100 may participate in an "election" process in order to determine which device is to be designated as the primary device that transmits a presence indicator to Bluetooth access point 90 based on information provided by the group of devices. The information provided by the group of devices is leveraged to provide a higher degree of confidence that the devices are indeed in the presence of user 100 (i.e., to avoid a situation where a device broadcasts a presence indicator signal even though associated user 100 is not actually in the vicinity), and that the most appropriate device is selected for transmitting the information.

It will be appreciated that each of the personal devices depicted in FIG. 2 has different characteristics and capabilities that impacts its appropriateness for the task of transmitting a presence indicator signal and/or verification of actual presence of user 100 in the vicinity. For example, laptop computer 140 may typically have a stronger battery and superior broadcasting capability when compared with smartwatch 150. However, computer laptop 140 may often be turned off as user 100 moves through a smart environment. In contrast, smartwatch 150 may more reasonably be assumed to be in continuous operation, and may also be configured to directly track heart rate, blood pressure, activity, etc., thereby providing a higher degree of certainty that it is, in fact, actually in proximity to, or being worn by a person such as user 100.

Similarly, when in operation, Bluetooth headset 120 may also provide a reasonably reliable indication of the presence of user 100. However, it's not unusual for a user to turn off a headset when not in actual use; thereby impacting on the reliability of headset 120 as a continuously available primary device. Smartphone 110 and computer tablet 130 may also have advantages in terms of battery strength and broadcasting power, but are more likely to be lost, misplaced, or purposely left behind by user 100 when moving through a smart environment.

Accordingly, the election process, may take into account a "beacon profile" for each device, i.e., the device characteristics that collectively indicate the suitability of the device to either broadcast the presence indicator signal, and/or to verify the actual presence of user 100 in the vicinity. Each characteristic may be scored, for example, from zero to one hundred, to derive a composite score for a device which may then be used to differentiate between the capabilities of the different devices. It will be appreciated that other scoring ranges, e.g., one to ten, may be used in a similar manner.

For example, the device's ability to broadcast based on battery power, antenna characteristics, etc., may be determined. Accordingly, computer laptop 140 may be accorded a score of ninety, based on battery life and antenna range. However, if computer laptop 140 is plugged in to a power source, it may receive a score of one hundred. Alternatively, if the battery is almost depleted, computer laptop 140 may receive a score of ten. Smartwatch 150, with limited battery storage and reduced antenna range may also receive a score of ten. Broadcast output power (expressed in mW) may also be used as a proxy for antenna range.

The estimated duration of broadcast, i.e., an estimate of how long the device may continue broadcasting the presence indicator signal before fully depleting the battery, may also be calculated and scored.

A presence confidence score may be calculated to reflect the likelihood that the device accurately represents a human's current presence. For example, computer laptop 140 may receive a score of zero if it is not in current use or the lid is closed. However, if laptop computer 140 detects ongoing key presses/mouse movement the presence confidence score might be increased to 100. Smartwatch 150 may be configured with biometric sensors such as a pulse monitor or step counter functionality. If smartwatch 150 detects a pulse or movements indicative of walking, the confidence may be scored as one hundred. However, if no pulse or even slight movement is detected (which may indicate that it is not being worn and sitting idle), the confidence may zero. In a further example, the presence confidence score for smartphone 110 may be a function of in use status, location based services, and/or motion detection.

The type of information provided by the device may also be scored. For example, smartwatch 150 might be best configured to detect heart rate, while smartphone 110 might be best configured to transmit historical information about location; even though both devices may have the ability to transmit generally the same type of data, one device will have a comparative advantage to transmit more information.

Accordingly, it will be appreciated by one of ordinary skill in the art that in order to be efficient and effective, the election process will be configured to take into account several variables. It will further be appreciated that the election process may be leveraged to fine time the detection of the presence of user 100, and/or when users leaves the vicinity of one, some, or all of the devices with which it is associated.

Figure 3:
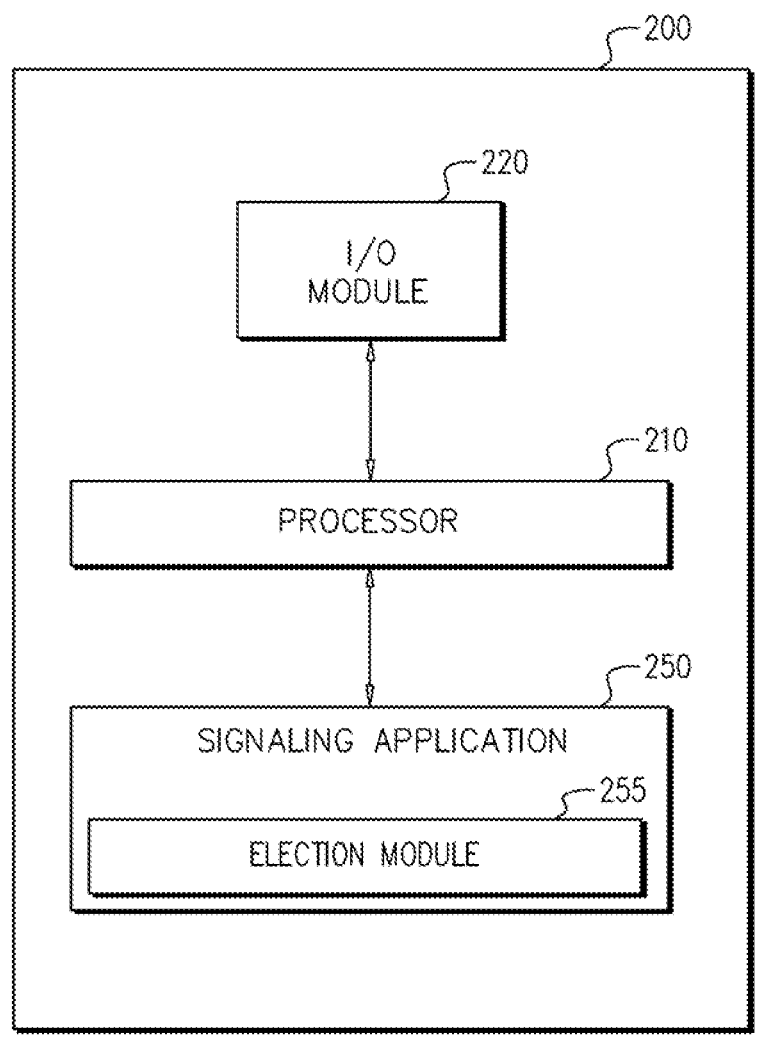
FIG. 3 is a block diagram of an exemplary computing device, constructed and operative in accordance with embodiments described herein to transmit a presence indicator signal as described with respect to FIGS. 1 and 2.

Reference is now made to FIG. 3 which is a block diagram of an exemplary computing device 200, constructed and operative in accordance with embodiments described herein to broadcast a presence indicator signal as described with respect to FIGS. 1 and 2.

As depicted in FIG. 2, computing device 200 may be implemented on a variety of Bluetooth LE enabled devices, for example, but not limited to, smartphone 110, Bluetooth headset 120, computer tablet 130, laptop 140, smartwatch 150, etc. As such, it will be appreciated that computing device 200 may be under the administrative and physical control of user 100, as opposed to the operator of the smart environment. Computing device 200 may also represent a robot or IoT device. It will be appreciated by one of ordinary skill in the art that computing device 200 comprises hardware and software components that provide at least the functionality of the embodiments described herein. For example, computing device 200 may comprise at least processor 210, input/output (I/O) module 220, and signaling application 250. It will also be appreciated that computing device 200 comprises other components and functionalities that have not been presented herein in the interests o f clarity of presentation of the embodiments described herein.

It will be appreciated that computing device 200 may comprise more than one processor 210. For example, one such processor 210 may be a special purpose processor operative to execute signaling application 250. Signaling application 250 may be any suitable application implemented in software and/or hardware that is operative to provide presence indicator signals as per the embodiments described herein. Signaling application 250 comprises election module 255. Election module 255 may be implemented in software and/or hardware and may be employed as necessary by signaling application 250 to "elect" a primary device from, among multiple computing devices 200. It will be appreciated by one of ordinary skill in the art that some or all of the functionality of election module 255 may be implemented on a smart environment server (not shown) that may be configured to facilitate the operation of enterprise application 250. For example, the enterprise server may be configured to arbitrate "disputes" between two devices 200 that for whatever reason have transmitted the same personal ID beacon as a presence indicator signal.

I/O module 220 may be implemented as a Bluetooth LE transceiver or similar means suitable for transmitting and receiving data between multiple computing devices 200 and/or Bluetooth access point 90 (FIG. 1). Such data may comprise Bluetooth, pairing signals, presence indicator signals, and/or data used by devices 200 to determine a primary device. It will be appreciated by one of ordinary skill in the art that other wireless technologies may be used instead of, or in addition to, Bluetooth to provide the functionality of I/O module. For example, I/O module 220 may also be implemented using WiFi.

Figure 4:
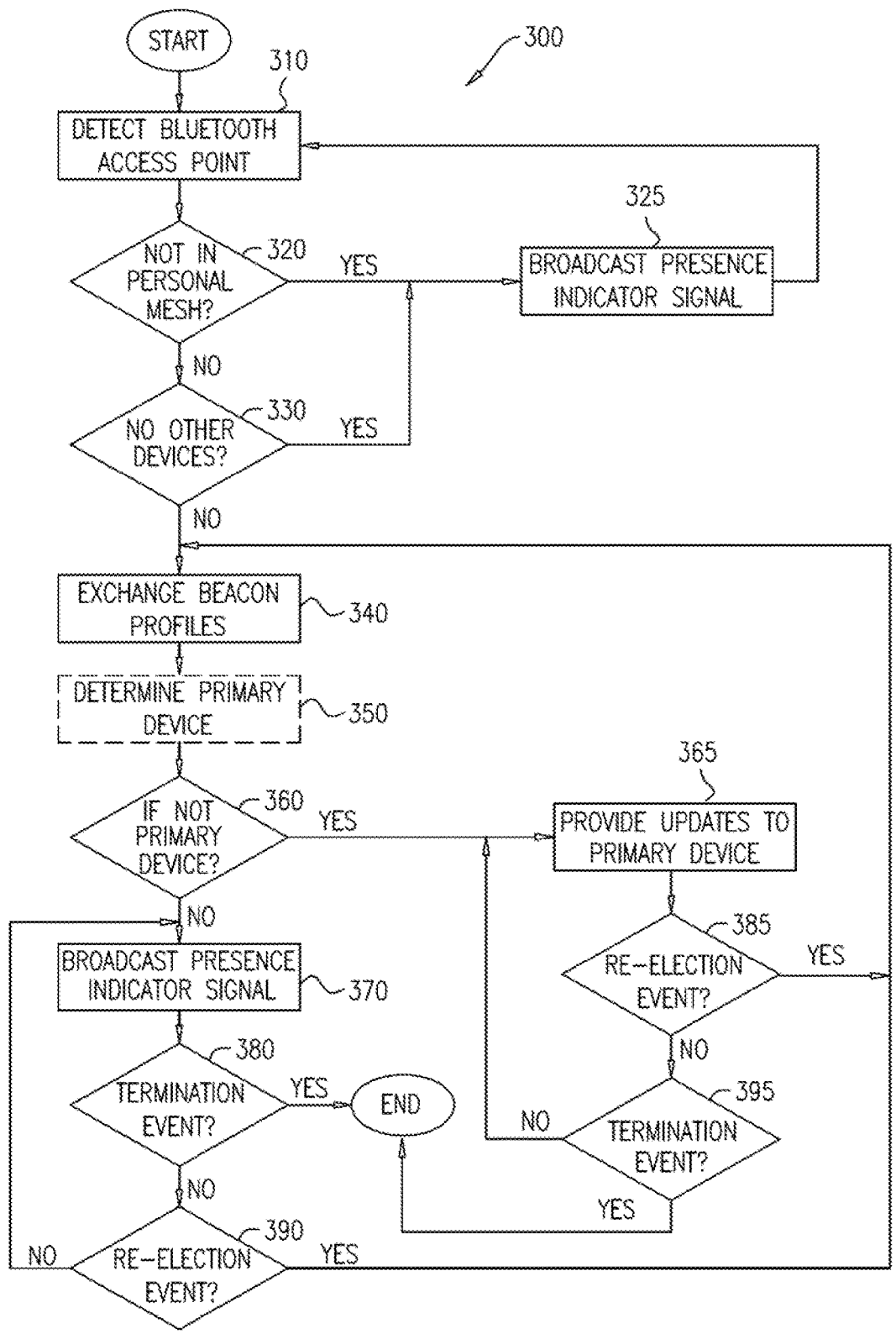
FIG. 4 is a flowchart illustration of an exemplary presence indicator signal transmission process, constructed and operative in accordance with embodiments described herein.

Reference is now made also to FIG. 4 which is a flowchart illustration of an exemplary presence indicator signal transmission process 300 to be performed by signaling application 250 (FIG. 3), constructed and operative in accordance with embodiments described herein. Signaling application 250 may employ I/O module 220 to detect (step 310) a Bluetooth receiver (e.g. Bluetooth receiver 90 from FIG. 1) associated with a smart environment management system. Alternatively, signaling application 250 may be configured to broadcast a presence indicator signal without first checking for the existence of a Bluetooth receiver (or any other type of receiver, depending on the technology used to implement I/O module 220 of FIG. 3). If computing device 200 is not associated with a personal mesh (step 320), i.e., multiple devices 200 configured to work in concert to provide presence indicator signals, signaling application 250 may employ I/O module 220 to broadcast (step 325) an appropriate presence indicator signal. It will be appreciated that if computing device 200 is a robot or IoT device, step 320 will return an answer of "No" and process control will flow to step 325.

If no Other computing devices are detected (step 330) i.e., I/O module 220 cannot detect other computing devices 200 associated with the personal mesh, process control will flow to step 325. Otherwise, signaling application 250 will employ I/O module 220 to exchange (step 340) beacon profiles with the other computing devices 200 in the personal mesh. It will be appreciated that since by definition the other computing devices 200 are in close vicinity, i.e., close enough to communicate with each other via short-range communication technologies such as Bluetooth or WiFi, this exchange may performed using a low power, small radius broadcast.

Signaling application 250 may employ election module 255 to determine (step 350) the primary device for the purposes of transmitting the presence indicator signal. It will be appreciated that each computing device 200 in the personal mesh may be configured to run the same election process to determine the primary device. However, in accordance with embodiments described herein, low powered, or constrained computing device 200 may delay executing step 350 for a configurable period of time (e.g., five or ten seconds) in order to conserve energy, with the assumption that a more powerful computing device 200 is likely associated with the personal mesh and will determine (based on the election process) that it will be the primary device. If a low powered/constrained computing device 200 detects another computing device 200 assume the role as primary device, it will skip step 250.

If computing device 200 is not the primary device (step 360), signaling application may provide (step 365) updates to the primary device. For example, if the non-primary device is smartwatch 150 it may provide human presence indications to the primary device which then broadcasts the presence indicator signal based on the human presence indications. It will be appreciated that the primary device may be configured to request specific information for updates based on the previously provided beacon profiles. This information may be requested periodically (e.g., every thirty or sixty seconds).

If computing device 200 is the primary device (step 360), it may periodically broadcast (step 370) the presence indicator signal if a termination event occurs (step 380), i.e., the primary device determines, based on the available information, that user 100 is no longer within the vicinity of the smart environment, process 300 ends.

It a "re-election event" occurs, process control may return to step 340, A re-election event may occur when a new computing device 200 joins the personal mesh, when a computing device 200 that was providing human presence information leaves the mesh, and/or when the capabilities of a participating computing device 200 change (e.g., battery is drained, or power source is added), and/or a device which had detected human presence is no longer able to detect human presence.

It will he appreciated that steps 385 and 395 may provide Functionality similar to steps 380 and 390 to non-primary devices.

It will also be appreciated that a one-time enrollment process may be necessary prior to the execution of process 300 in a given smart environment.

It will be appreciated that sometimes, a device with the capacity to broadcast may not be the best device to detect whether user 100 is present. Therefore, by communicating within the personal mesh, validation of human presence may be performed on one computing device 200, while broadcasting the presence indicator signal may occur on another. For example, if user 100 has both computer laptop 140 and smartwatch 150 (as per FIG. 2), the election process would typically pick the computer laptop 140 as the primary broadcasting device which would use presence information provide by smartwatch 150 to determine that user 100 is present. If user 100 leaves the room without computer laptop 140, computer laptop 140 and smartwatch 150 will not be able to "hear" one another and will begin a re-election. Smartwatch 150 will determine that it is a primary device because it is the only computing device 100 in the personal mesh. Given its presence information, it will then broadcast the presence indicator signal. Computer laptop 140 will similarly elect itself as the primary device, but since there will be no confidence that user 100 is there (because there is no activity on the keyboard/mouse) it will not broadcast the presence indicator signal.

It will therefore be appreciated that using the election process for computing devices 200 in a personal mesh may facilitate the conservation of battery power and improve broadcast capability while providing confidence that primary devices that broadcast presence indicator signals are in face with user 100 at that time.

It will further be appreciated that in accordance with embodiments described herein, a network of wireless transmission receivers maybe leveraged to more accurately detect human presence in a room (without the pitfalls of motion detection, or IR), by reducing complications from visual obstructions and/or potential false positives. The embodiments described herein provide a method and system for letting smart environments know how many humans are in a space, by having one device with die human broadcast out a presence indicator signal. This presence indicator signal may indicate a specific human, by using a personally identifiable beacon ID for that individual. The smart building may then customize the environment for that specific human. Alternatively, the presence indicator signal can broadcast out a 'generic human' beacon (not personally identifiable) to let the smart environment know that a human is present, without indicating who it is. This may further be enabled and disabled based on geo-location, to address privacy concerns.

It will similarly be appreciated that the embodiments described herein leverage the existence of one or more transmission-capable devices that are already in the possession of, and in use by, a user to interact with a smart environment management system. The devices are provided by the user, thereby freeing the operator of the smart environment from the need to provide, maintain and/or control signaling hardware to track humans in the smart environment.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for providing presence information in a smart environment, the method implemented on a personal computing device associated with a user and comprising:
   broadcasting a presence indicator signal in said smart environment, wherein said presence indicator signal indicates presence of said user in said smart environment, and said personal computing device is not provided by an operator of said smart environment;
   detecting at least one other personal computing device associated with said user;
   exchanging information regarding at least broadcast capabilities and human presence detection capabilities with said at least one other personal computing device; and
   based on said exchanged information, electing a primary device to broadcast a presence indicator signal, said electing from among said personal computing device and said at least one other personal computing device.

2. The method according to claim 1 and further comprising:
   defining said presence indicator signal as a personal beacon signal, wherein said personal beacon signal is associated with said user.

3. The method according to claim 1 and further comprising:
   defining said presence indicator signal as a generic human signal, wherein said generic human signal indicates a generic user without association with a specific user.

4. The method according to claim 1 wherein said personal computing device is a wearable smart device.

5. The method according to claim 1 wherein said personal computing device is a smartphone.

6. The method according to claim 1 and wherein said personal computing device is a computer tablet or computer laptop.

7. The method according to claim 1 wherein said broadcasting comprises determining that said personal computing device is in proximity to said user based on at least input from a biometric sensor.

8. The method according to claim 1 wherein said broadcasting comprises determining that said personal computing device is in proximity to said user based on at least input from location based services.

9. The method according to claim 1 wherein said broadcasting comprises determining that said personal computing device is in proximity to said user based on at least movement detection.

10. The method according to claim 1 wherein said broadcasting comprises determining that said personal computing device is in proximity to said user based on at least a key press or mouse input.

11. The method according to claim 1 where said broadcasting is performed using Bluetooth LE.

12. A mobile smart device comprising:
    means for broadcasting a presence indicator signal in a smart environment, wherein said presence indicator signal indicates presence of a user associated with said mobile smart device in said smart environment, and said mobile smart device is not provided by an operator of said smart environment; and
    means for defining said presence indicator signal as either a personal beacon signal or a generic human signal, wherein said personal beacon signal indicates said user, and said generic human signal indicates a generic user that is not associated with a specific user;
    means for detecting at least one other personal computing device associated with said user;
    means for exchanging information regarding at least broadcast capabilities and human presence detection capabilities with said at least one other personal computing device; and
    means for electing a primary device to broadcast a presence indicator signal based on said exchanged information, said electing from among said personal computing device and said at least one other personal computing device.

* * * * *